United States Patent
Lu et al.

(10) Patent No.: US 12,547,531 B2
(45) Date of Patent: Feb. 10, 2026

(54) SYSTEMS AND METHODS FOR OPERATING WEB MANAGEMENT SOFTWARE

(71) Applicant: SAP SE, Walldorf (DE)

(72) Inventors: Xiaoping Lu, Sydney (AU); Martin Maria Norato Auer, Elsendorf (DE); Aseem Mittal, Toronto (CA)

(73) Assignee: SAP SE, Walldorf (DE)

( * ) Notice: Subject to any disclaimer, the term of this patent is extended or adjusted under 35 U.S.C. 154(b) by 212 days.

(21) Appl. No.: 17/949,702

(22) Filed: Sep. 21, 2022

(65) Prior Publication Data
US 2024/0095157 A1   Mar. 21, 2024

(51) Int. Cl.
G06F 11/3668 (2025.01)
G06F 11/362 (2025.01)

(52) U.S. Cl.
CPC ...... *G06F 11/3688* (2013.01); *G06F 11/3636* (2013.01); *G06F 11/3692* (2013.01)

(58) Field of Classification Search
CPC ............. G06F 11/3688; G06F 11/3636; G06F 11/3692
USPC ........................................................ 717/124
See application file for complete search history.

(56) References Cited

U.S. PATENT DOCUMENTS

| | | | | |
|---|---|---|---|---|
| 10,819,560 B2 * | 10/2020 | Makovsky | ............. | G06Q 10/10 |
| 11,240,385 B1 * | 2/2022 | Robles Flores | .... | H04N 1/00037 |
| 11,245,726 B1 * | 2/2022 | Kats | ....................... | G06N 20/00 |
| 2009/0210376 A1 * | 8/2009 | Lorge | ....................... | G06N 5/04 |
| | | | | 706/47 |
| 2017/0024305 A1 * | 1/2017 | Betser | ................. | G06F 11/3644 |
| 2022/0237071 A1 * | 7/2022 | Wong | .................. | G06F 11/0793 |

* cited by examiner

*Primary Examiner* — Bradford F Wheaton
(74) *Attorney, Agent, or Firm* — SCHWEGMAN LUNDBERG & WOESSNER, P.A.

(57) ABSTRACT

Various examples are directed to systems and methods for administering web management software. A system may access alert data describing a plurality of alerts generated by a cloud-implemented web management software and apply a set of problem code conditions to the alert data. Based on the applying of the set of problem code conditions to the alert data, the system may assign a first problem code to the first alert. The system may determine a risk score for the web management software based at least in part on a problem state for the web management software, where the problem state comprises at least the first problem code. The system may determine that the risk score for the web management software matches a threshold condition and send a problem message to a user computing device associated with a user, the problem message describing a problem state of the web management software.

20 Claims, 10 Drawing Sheets

SYSTEMS AND METHODS FOR OPERATING WEB MANAGEMENT SOFTWARE

BACKGROUND

Web management software may be used to provide various aspects of a website to users. For example, web management software may serve various webpages to users and provide related functionalities. In the context of an e-commerce website, for example, web management software may serve pages describing products and services that are available for sale. The web management software may also support functionality to manage, for example, a shopping cart feature for users, payment mechanisms, delivery scheduling, and/or the like.

DETAILED DESCRIPTION

Figure 1:
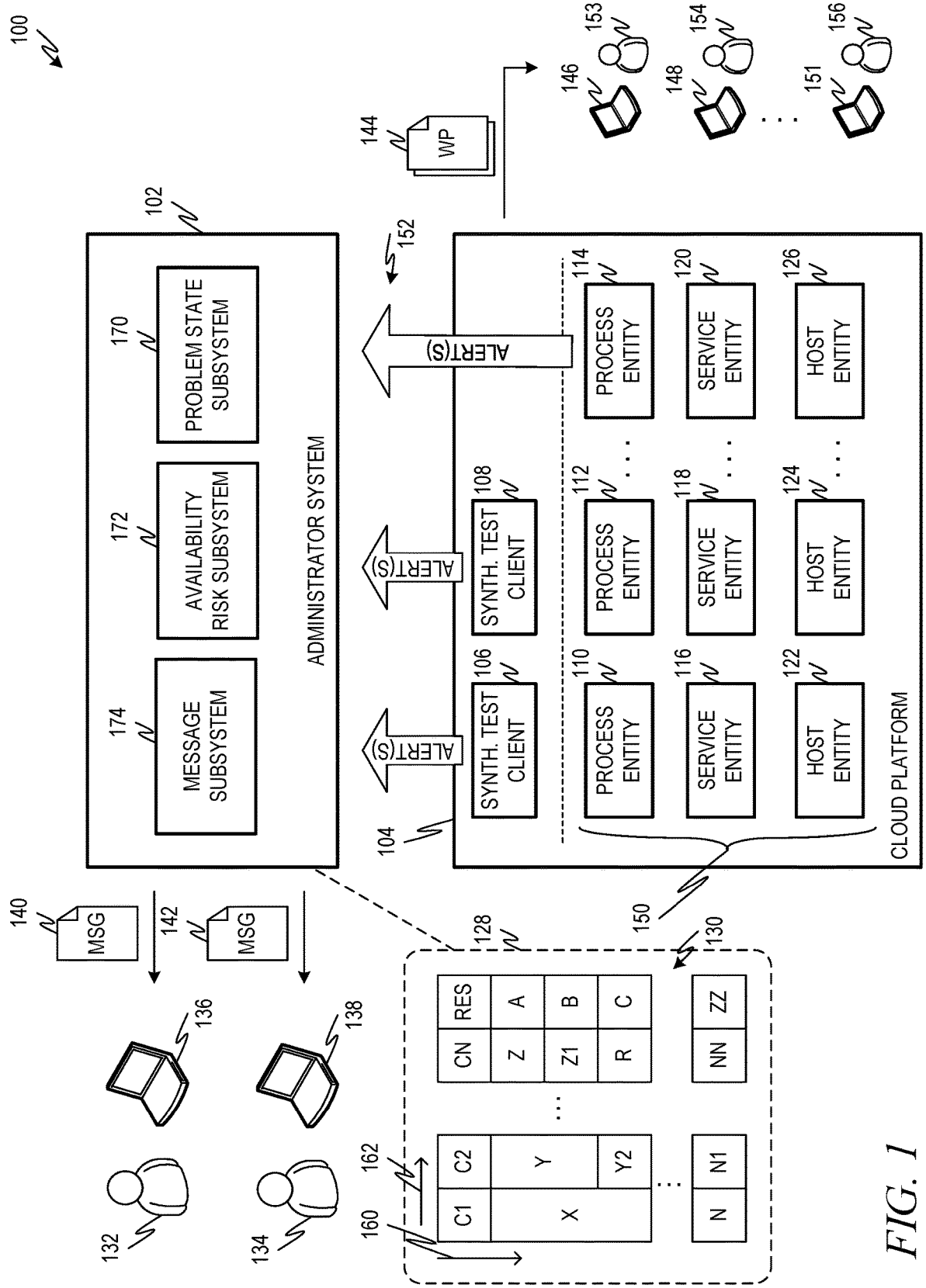
FIG. 1 is a diagram showing one example of an environment including web management software implemented at a cloud platform.

Web management software may be implemented using multiple executables such as processes, services, and the like. Different processes and services of the web management software may handle different aspects and/or functionalities. For example, some processes may manage the rendering and serving of webpages to users. Other processes may provide other functionality to users such as, for example, payment mechanisms, delivery scheduling, media playback, and/or the like. Services may be executed to handle backend tasks supporting the various processes. The various processes and services may execute at or through various hosts. A host may be or include hardware and/or software for executing processes and services. In some examples, a host may be a virtual host such as a virtual machine and/or a container where one or more services or one or more processes execute inside the virtual machine or container.

In some examples, web management software is implemented using a cloud platform. A cloud provider makes the cloud platform available to an implementing enterprise. The implementing enterprise may be, for example, a business, an individual, or any other unit implementing web management software using the cloud platform. The cloud platform may include various hosts as well as services and processes. The implementing enterprise may supplement and/or modify the services and processes to generate customized web management software. An example of such a cloud platform for implementing web management software is the Commerce Cloud™ product available from SAP SE of Waldorf, Germany.

Web management software can sometimes be challenging to administer. For example, web management software may include many processes and services implemented using many hosts. Various entities of the web management software, such as hosts, services, processes, and the like, may encounter problems during execution. Some problems may be severe and may entail a significant risk to the availability of one or more aspects of the web management software such as webpages, functionalities, and/or the like. Other problems may be relatively minor and may not present a significant availability risk. Also, in some examples, the severity of the availability risk associated with a problem in one entity may depend on the states of other entities. For example, different combinations of entity problems may have different severities.

During operation of web management software, the various entities making up the web management software (e.g., hosts, processes, and services) may generate alerts upon encountering a problem. An alert may indicate the entity encountering a problem and may describe the problem encountered. Because there are many entities in web management software, the volume of alerts may be quite high. It may be difficult for a human user to accurately determine the state of the web management software based on the alerts received. For example, the received alerts may not provide a clear indication of the risk of failure for any content or functionality provided by the web management software. This may make it difficult for administrative users of the cloud provider and/or administrative users of the implementing enterprise to administer the web management software. For example, it may not be clear from a set of alerts generated by the web management software whether there is a significant availability risk to the web management software.

The challenges of administering web management software may be greater when the web management software is implemented using a cloud platform. For example, when the web management software is implemented using a cloud platform, some of the constituent entities may be developed by the cloud provider whereas other entities may be provided by and/or modified by the implementing enterprise. As a result, the knowledge to accurately determine the availability risk associated with various alerts and combinations of alerts may be distributed among developers and or users of the cloud provider and the implementing enterprise, further complicating administration.

Various examples address these and other challenges by implementing systems and methods for operating web management software utilizing problem code conditions to assign problem codes to a portion of the alerts generated by the entities of a cloud implemented web management software solution. For example, an administrator system may assign a problem code to alerts generated by entities of the web management software having an entity type, an entity name, and an alert type meeting the set of problem code conditions. The problem code assigned to a particular alert, if any, may be indicated by the problem code conditions. If the web management software is described by one or more problem codes, the administrator system may use the problem codes to determine a risk score for the web management software. The risk score may indicate an availability risk for the web management software. The administrator system may send a problem message to one or more administrative users when the availability risk of the web management software is greater than the threshold value. In this way, the administrative user may identify problems at the web management software that are likely to affect availability.

FIG. 1 is a diagram showing one example of an environment 100 including web management software 150 implemented at a cloud platform 104. An administrator system 102 receives alerts 152 describing problems at the web management software 150. The administrator system 102 uses the alerts 152 to determine an availability risk score, also referred to herein as a risk score for the web management software 150. Using the risk score, the administrator system 102 may detect when the combination of alerts 152 received from the cloud platform 104 indicate a risk score meeting a threshold condition. When the risk score meets the threshold condition, the administrator system 102 may send one or more problem messages 140, 142 to administrative users 132, 134 via respective user computing devices 136, 138.

The web management software 150 may provide various webpages 144 and associated functionalities to users 153, 154, 156 via user computing devices 146, 148, 151. Webpages 144 may be or include any suitable type of webpage comprising any suitable content. In some examples, the webpages 144 include e-commerce webpages for facilitating the sale of goods and/or services to the users 153, 154, 156. Webpages 144 may also be supported by various other functionalities. For example, when goods and/or services are available for purchase via the webpages 144, the web management software 150 may provide one or more payment mechanisms allowing users 153, 154, 156 to provide payment for goods and/or services. Other example functionalities that may be provided to the users 153, 154, 156 by the web management software 150 include functionality for arranging delivery of goods and services, functionality for playing multimedia, functionality for loading content, and/or the like.

The web management software 150 may include various processes 110, 112, 114, various services 116, 118, 120, and various hosts 122, 124, 126. The processes 110, 112, 114 and services 116, 118, one 120 are executed at the cloud platform 104. Hosts 122, 124, 126 may be hardware entities and/or virtual infrastructure entities that also execute at the cloud platform 104. For example, hosts 122, 124, 126 may be or include hardware of the cloud platform 104 and/or may be or include software executing at hardware of the cloud platform 104. For example, one or more of the hosts 122, 124, 126 may include a virtual machine, container, or other executable runtime environment.

The cloud platform 104 may include one or more compute elements, one or more storage elements, and/or one or more network elements that are implemented using hardware provided by a cloud hyperscaler such as, for example, AWS' from Amazon.com, Inc., Google Cloud™ from Google LLC., Azure™ from Microsoft, Inc., and Alibaba Cloud™ from Alibaba Group Holding Limited, among others. The cloud platform 104 may be implemented in a private cloud environment or in a public cloud environment. In a private cloud environment, the cloud platform 104 may be managed by the implementing enterprise. For example, the implementing enterprise may receive code for implementing some or all of the processes 110, 112, 114, the services 116, 118, 120, and or other components of the web management software 150 from a third party and execute those entities in the private cloud environment managed by the implementing enterprise. In a public cloud environment, the cloud platform 104 may be implemented within a tenancy held by the implementing enterprise. The cloud provider may make the cloud platform 104 available to the implementing enterprise and may provide some or all of the processes 110, 112, 114, services, 116, 118, 120, and/or hosts 122, 124, 126. The implementing enterprise may modify and/or provide a portion of the processes 110, 112, 114 and/or services 116, 118, 120.

An administrator system 102 may receive alerts 152 generated based on monitoring the web management software 150. The administrator system 102 may, based on the alerts 152, determine a risk score for the web management software 150. The risk score may indicate an availability risk for the web management software 150. The availability risk may indicate a risk that some or all of the webpages 144 and/or functionalities associated with one or more of the webpages 144 will become unavailable to users 153, 154, 156. The administrator system 102 may be any suitable computing device or set of computing devices in a single geographic location or distributed across multiple geographic locations. In some examples, the administrator system 102 may be implemented in whole or in part as software executing at the cloud platform 104.

Alerts 152 may be generated by the various components of the web management software 150 such as processes 110, 112, 114, services 116, 118, 120, and hosts 122, 124, 126. In some examples, all or a portion of the alerts 152 are generated by synthetic test clients 106, 108. Synthetic test clients 106, 108 are applications including one or more executables that may execute at the cloud platform 104 to perform various testing operations on the web management software 150. For example, a synthetic test client 106, 108 may perform various tests by querying the web management software 150 and observing the response. In some examples, a synthetic test client 106, 108 may test the availability of various webpages 144 and/or functionalities associated with various webpages 144. The synthetic test client 106, 108 may request a webpage 144 under test and or/a functionality under test within a webpage 144 and observe, for example, whether the web management software 150 responds correctly to the request, how long it takes the web management software 150 to respond to the test request, and/or any other suitable metrics.

The administrator system 102 may process alerts 152 on a periodic basis. For example, the administrator system 102 may collect alerts 152 received during a first time period. Alert data corresponding to the alerts 152 received during the first time period may be processed, a risk score generated, and one or more messages 140, 142 sent to administrative users 132, 134. This process may be repeated for subsequent time periods. For example, the administrator system 102 may also collect alerts 152 received during a second time period. Alert data corresponding to the alerts 152 received during the second time period may be processed, a risk score generated, and one or more messages 140, 142 sent to administrative users 132, 134.

The administrator system 102 may comprise a problem state subsystem 170. The problem state subsystem 170 may receive alerts 152 and determine a problem state for the web management software 150 corresponding to the alerts 152. For example, the problem state subsystem 170 may apply a set of problem code conditions to the alerts 152 for a given time to determine the problem state for the web management software 150 in that time period. The problem code conditions may describe problem codes that are associated with one or more of the alerts 152. For example, the administrator system 102 may apply the set of problem code conditions to each alert 152. For some alerts 152, the set of problem code conditions will indicate a problem code to be associated with the alert 152. For other alerts, the set of problem code conditions may not indicate a problem code that is to be associated with the alert 152. The problem code or codes based on the application of the problem code conditions may indicate the problem state of the web management software 150.

The set of problem code conditions may include various types of conditions such as, for example, one or more entity type conditions, one or more entity name conditions, and/or one or more alert type conditions. An entity type condition may describe a type of entity that either generated or is the subject of an alert 152. An entity type condition may apply to an alert 152 if the alert 152 was either generated by or describes an entity having an entity type meeting the entity type condition. For example, an entity type condition may indicate a synthetic test client-type entity. Alerts generated by synthetic test clients 106, 108 may meet such an example entity type condition.

An entity name condition may describe a particular entity that either generated or is the subject of an alert 152. An entity name condition may apply to an alert 152 if the alert was either generated by or describes an entity having the name indicated by the entity name condition. For example, an entity name condition indicating a name of the process 110 may apply to an alert 152 if the alert 152 was either generated by or describes the process 110.

A alert type condition may describe a test associated with an alert 152. For example, alerts 152 may be generated when an entity, such as a process, service, or host, receives a result on a test indicating a problem with the entity. For example, a alert type condition indicating a database connection failure may apply to an alert 152 if the alert 152 was generated as the result of an entity failing a database connection test, indicating that the entity has lost its connection to a database.

In various examples, the set of problem code conditions may be applied in a nested manner. For example, when considering an alert 152, the administrator system 102 may first apply an entity name condition. If the alert 152 fails to meet the entity name condition, the administrator system 102 may move to a next entity name condition. If the alert 152 fails to meet any entity name conditions of the set of problem code conditions, the administrator system 102 may not assign a problem code to the alert 152. If an alert 152 meets an entity name condition of the set of problem code conditions, the administrator system 102 may begin to apply a set of entity name conditions to the alert 152. The entity name conditions applied by the administrator system 102 may be based on the entity type condition met by the alert 152. For example, the administrator system 102 may apply entity name conditions associated with the entity type condition that was met (e.g., entity name conditions indicating describing entities of the same type indicated by the entity type condition).

The administrator system 102 (e.g., the problem state subsystem 170 thereof) may apply a problem code to an alert 152 based on the combination of entity type condition, entity name condition, and alert type condition that are met by the alert 152. If the alert 152 does not meet any combination of entity type condition, entity name condition, and entity alert type condition indicated by the set of problem code conditions, then the administrator system 102 may not apply a problem code to that alert 152. In some examples, the problem code assigned to the web management software 150 based on an alert 152 may convey data related to the underlying issue that caused the alert 152 leading to the problem code. For example, a problem code may indicate an entity type of the entity that is the subject of the alert, an entity code indicating the specific entity that is the subject of the alert, a problem type indicating a type of the problem that initiated the alert 152, and a severity indicating the severity of the problem. An example format for problem codes is provided below:

X-Y**-###

In the example problem code format above, X indicates the severity of the underlying problem and Y indicates the entity type of the subject entity. The asterisks (**) indicate the identity of the subject entity. The hashes (###) indicate the problem type.

In this way, the administrator system 102 (e.g., the problem state subsystem 170 thereof) may determine a problem state for the web management software, for example, in a given time period. The problem state may include problem codes, if any, assigned to the alerts 152 received during the given time period. The administrator system 102 may also include an availability risk subsystem 172. From the problem state, the administrator system 102 (e.g., the availability risk subsystem 172 thereof) may determine a risk score for the web management software 150 in the given time period. If the risk score meets a threshold condition, the administrator system 102 (e.g., a message subsystem 174 thereof) may send a message to an administrative user 132 associated with the implementing enterprise and/or may send a problem message 142 to an administrative user 134 associated with the cloud provider.

In some examples, the administrator system 102 may utilize a tabular data structure to apply the set of conditions to an alert 152 and/or to determine a risk score from the problem state for the web management software 150. FIG. 1 shows a breakout window 128 including an example tabular data structure 130 that may be used to apply conditions in a nested manner, as described herein. The tabular data structure 130 includes columns C1, C2, CN, RES and various rows associated with the columns. Columns C1, C2, and CN indicate conditions and column RES indicates a result. In the example tabular data structure 130, conditions indicated in the column C1 may be of a first condition type. Conditions indicated in the column C2 may be of a second condition type, and conditions indicated in the column C may be of a third condition type. The result column RES may indicate results associated with the combination of conditions in a given row.

In the example tabular data structure 130, conditions indicated in the column C2 may be nested under conditions indicated in the column C1. Similarly, conditions indicated in the column CN may be nested under conditions indicated in the column C2. For example, in the tabular data structure 130, X is a condition in the column C1. Conditions Y and Y2 in the column C2 may be nested under the condition X. Similarly, conditions Z and Z1 in the column CN may be nested under the condition Y. The condition R in the column C may be associated with the condition Y2.

A tabular data structure, such as the example tabular data structure 130, may be stored in a memory or other data storage location accessible by the administrator system 102 and may be accessed to apply a set of conditions, described herein. To apply a set of conditions, such as a set of problem code conditions, in a nested manner using a data structure such as the example tabular data structure 130, the administrator system 102 may traverse the tabular data structure 130 in a row-by-row manner. For example, the administrator system 102 may apply conditions in the column C1 in a direction indicated by the arrow 160. If a condition from column C1 is met, the administrator system may move to a next column in the direction indicated by the arrow 162 (in this example, the column C2). From the next column, the administrator system 102 may apply conditions associated with the condition from the column C1 that was met. The process may continue until the administrator system 102 reaches a result or runs out of conditions.

Consider an example in which the tabular data structure 130 is used by the problem state subsystem 170 to apply a set of problem code conditions to an alert 152. In this example, the column C1 includes entity type conditions, the column C2 includes entity name conditions, the column CN includes alert type conditions, and the result column RES includes problem codes. The problem state subsystem 170 may traverse the column C1 in the direction indicated by arrow 160 to determine if the considered alert 152 meets any of the entity name conditions listed in column C1. If the considered alert 152 does not meet any of the entity name conditions listed in column C1, then the problem state subsystem 170 may not assign a problem code to the alert 152.

If the considered alert 152 does meet any entity type condition from the column C1, then the problem state subsystem 170 may move to the column C2 in the direction given by the arrow 162 and began applying entity name conditions from the column C2. The problem state subsystem 170 may, in some examples, apply only entity name conditions that describe entities meeting the entity type condition that was previously met. For example, when an alert 152 meets the entity type condition X, the problem state subsystem 170 may only apply entity name conditions Y, Y2 describing entities of the entity type given by condition X.

If the considered alert 152 does not meet any entity name conditions associated with the relevant entity type condition, then no problem code may be assigned to the alert 152. If the considered alert does meet an entity name condition, the problem state subsystem 170 may apply alert type conditions from the column CN. The alert type conditions applied may be those alert type conditions that are associated with the relevant entity name condition from column C2. If no alert type conditions associated with the relevant entity name condition are met, the problem state subsystem 170 may not assign a problem code to the alert 152. If a alert type condition is met, the problem state subsystem 170 may assign a problem code to the alert 152, where the problem code is indicated in the result column RES in a row corresponding to the alert type condition that was met.

Consider another example in which the tabular data structure 130 is used by the availability risk subsystem 172 to apply a set of risk score conditions to determine a risk score. The availability risk subsystem 172 may traverse the column C1 in the direction indicated by the arrow 160 applying risk score conditions to the problem state for the web management software 150. If the problem state for the web management software 150 matches a condition from the column C1, the availability risk subsystem 172 may traverse to the next column C2 in the direction of arrow 162 and began applying risk conditions from the column C2 that are associated with the matched condition from the column C1. This process may continue until the availability risk subsystem 172 reaches a result indicated by column RES. In this example, the result may be a risk score.

In some examples, sets of conditions such as problem code conditions or risk score conditions can be stored in formats other than a tabular data structure. For example, sets of conditions as described herein may be stored in a JavaScript Object Notation (JSON), in a database table or other database structure, or in any other suitable format.

Figure 2:
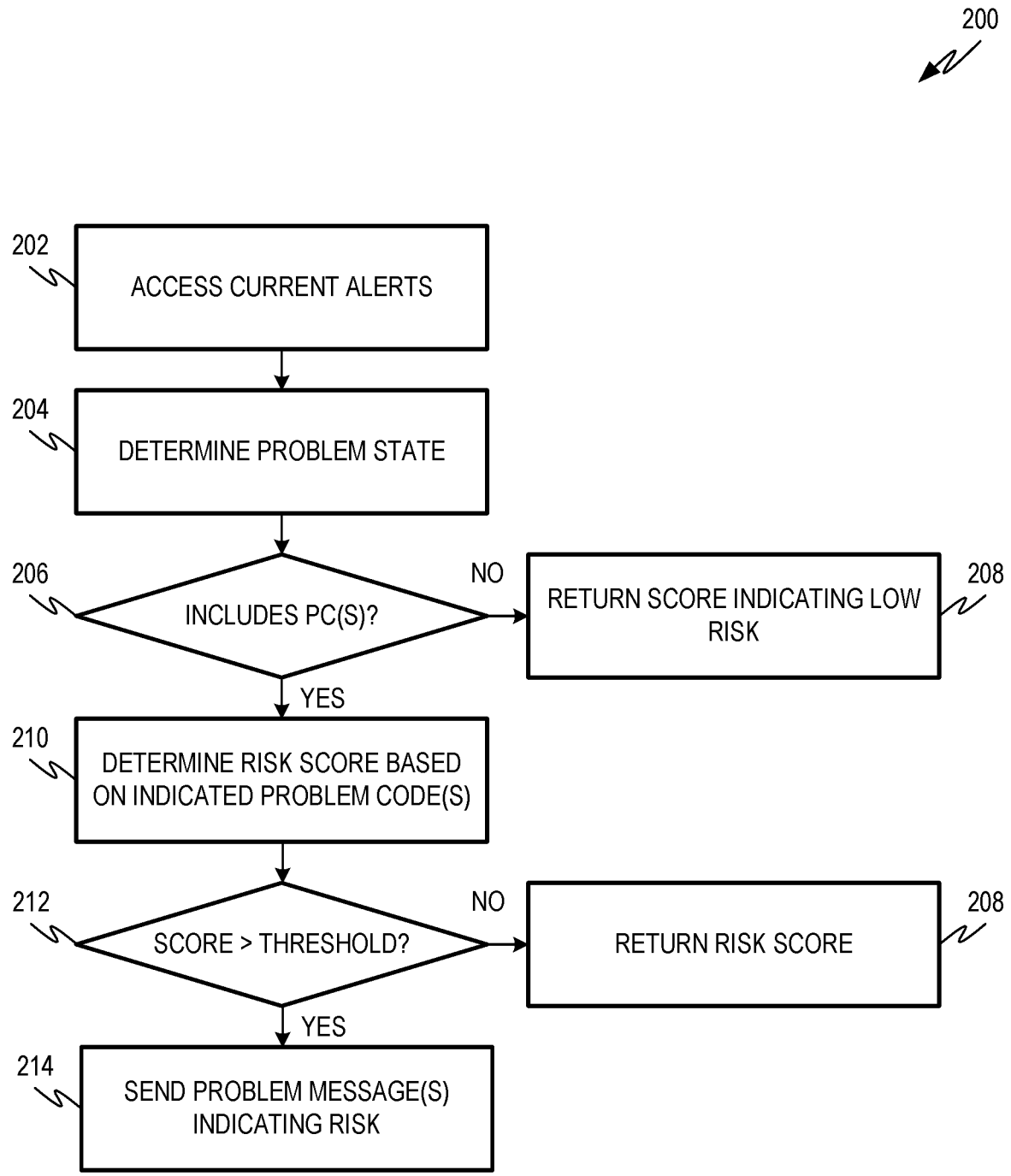
FIG. 2 is a flow chart showing one example of a process flow that may be executed by the administrator system of FIG. 1 to administer the web management software.

FIG. 2 is a flow chart showing one example of a process flow 200 that may be executed by the administrator system 102 to administer the web management software 150. At operation 202, the administrator system 102 (e.g., the problem state subsystem 170 thereof) may access current alerts 152. As described herein, the current alerts 152 may be alerts received by the administrator system 102 during a current time period. The time period may be of any suitable length such as, for example, one second, thirty seconds, one minute, five minutes, and so on.

At operation 204, the administrator system 102 (e.g., the problem state subsystem 170 thereof) may apply a set of problem code conditions to alert data, where the alert data comprises the alerts accessed at operation 202. The set of problem code conditions may be stored using a tabular data structure such as, for example, the tabular data structure 130 described with respect to FIG. 1. The administrator system 102 may determine the problem state of the web management software 150 for the current time period. This may include applying the set of problem code conditions to the alert data to generate relevant problem codes. The problem code conditions may be applied to each individual alert of the alert data. As described herein, applying the problem code conditions to an alert may or may not result in a problem code for that alert. Accordingly, the problem state for the web management software 150 may include one problem code, multiple problem codes, or no problem codes.

At operation 206, the administrator system 102 (e.g., the problem state subsystem 170 and/or the availability risk subsystem 172 thereof) determines if the problem state for the web management software 150 determined at operation 204 includes any problem codes. If no problem codes are included, the administrator system 102 (e.g., the availability risk subsystem 172) may, at operation 208, return a risk score indicating a low availability risk for the web management software 150. For example, if the application of the problem code conditions to the alert data fails to identify any alerts that have corresponding problem codes, it may be an indication that the alerts generated during the current time period do not indicate a significant availability risk.

If the problem state determined at operation 204 does include one or more problem codes, the administrator system 102 (e.g. the availability risk subsystem 172) may, at operation 210, determine a risk score based on the problem code or codes making up the problem state for the current time period. The risk score may be determined by applying one or more conditions to the problem state, for example, as described herein. At operation 212, the administrator system 102 (e.g., the availability risk subsystem 172 and/or the message subsystem 174 thereof) determines whether the risk score from operation 210 is greater than a threshold. If the risk score is not greater than the threshold, indicating that the availability risk to the web management software 150 is not high, then the administrator system may return the risk score at operation 208. If the risk score is greater than the threshold, indicating that the availability risk to the web management software is high, then the administrator system 102 (e.g., the message subsystem 174 thereof) may, at operation 214, send one or more problem messages 140, 142 to one or more of the users 132, 134. The problem messages 140, 142 may include a description of the problem state for the web management software 150. This may include the problem codes making up the problem state and/or a human-readable description of the problem codes. In some examples the problem messages 140, 142 may include additional information, for example, as described herein.

Figure 3:
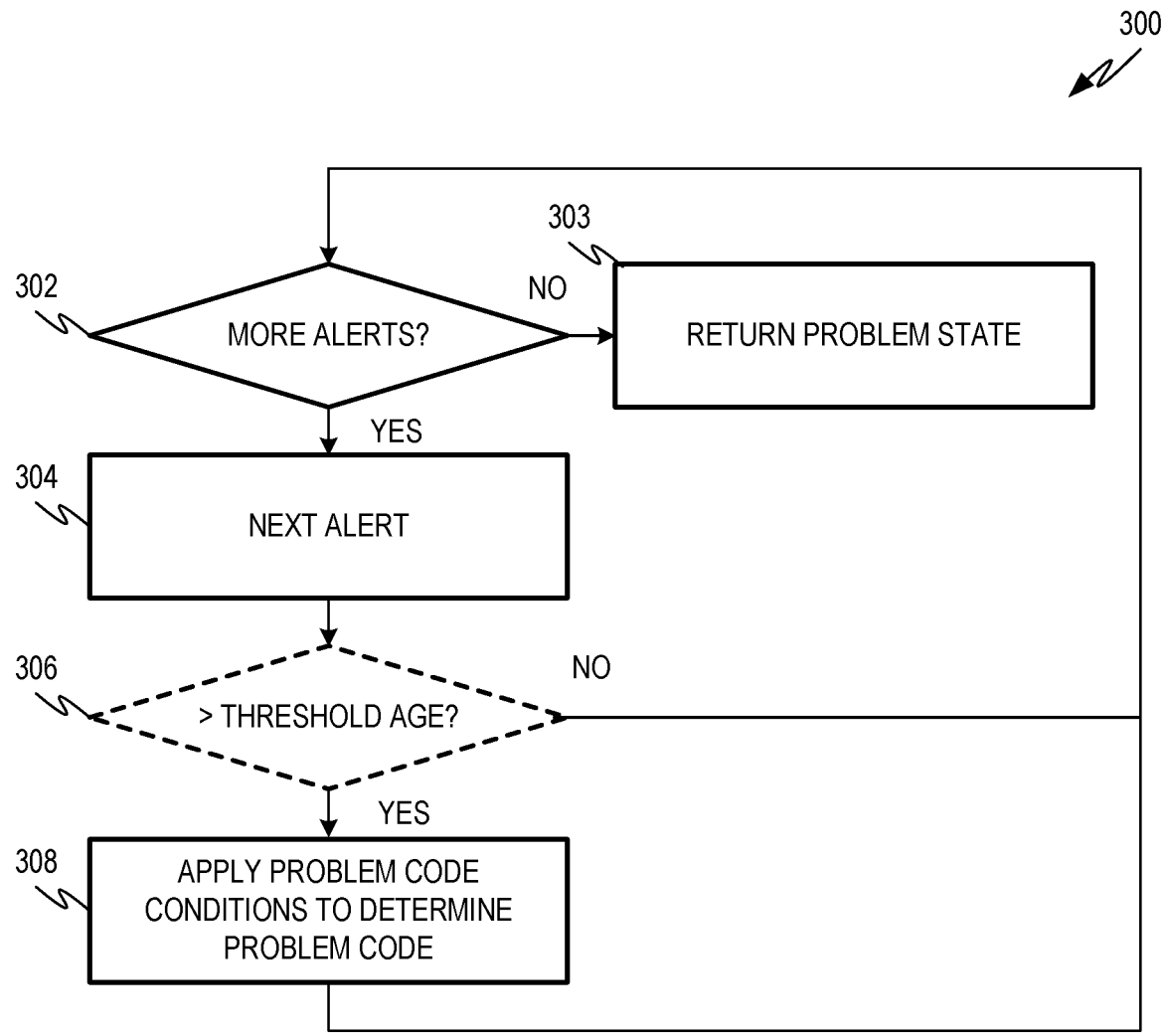
FIG. 3 is a flow chart showing one example of a process flow that may be executed by the administrator system of FIG. 1 to process alerts from a current time period to generate a problem state of the web management software.

FIG. 3 is a flow chart showing one example of a process flow 300 that may be executed by the administrator system 102 (e.g., the problem state subsystem 170 thereof) to process alerts 152 from a current time period to generate a problem state of the web management software 150. For example, the process flow 300 shows one example way that the administrator system 102 (e.g., the problem state subsystem 170 thereof) can execute operation 204 of the process flow 200.

At operation 302, the administrator system 102 (e.g., the problem state subsystem 170 thereof) determines if there are additional alerts 152 received during the current time period. If there are additional alerts, then the administrator system 102 moves to the next alert at operation 304. At optional operation 306, the administrator system 102 determines if the issue indicated by the considered alert is less than a threshold age. If the issue is less than a threshold age, then the administrator system 102 may return to operation 302 to determine if there are any additional alerts to be considered. In this way, when the optional operation 306 is executed, the administrator system 102 may not consider an alert 152 as part of the problem state of the web management software until the underlying issue has existed for at least the time indicated by the threshold age. In some examples, the threshold age corresponds to a number of instances of the time period.

If the optional operation 306 is omitted, and/or if the issue indicated by the considered alert 152 is greater than the threshold age, the administrator system 102 (e.g., the problem state subsystem 170 thereof) may, at operation 308, apply problem code conditions to determine a problem code, if any, associated with the alert. Upon determining the problem code, if any, associated with the considered alert 152, the administrator system 102 may return to operation 302 to determine if there are any additional alerts 152 from the current time period to be considered. When there are no more alerts to be considered at operation 302, the administrator system 102 (e.g., the problem state subsystem 170 thereof) may return the current problem state of the web management software 150 at operation 303. As described herein, the current problem state of the web management software 150 may include zero problem codes, one problem code, or more than one problem code.

Figure 4:
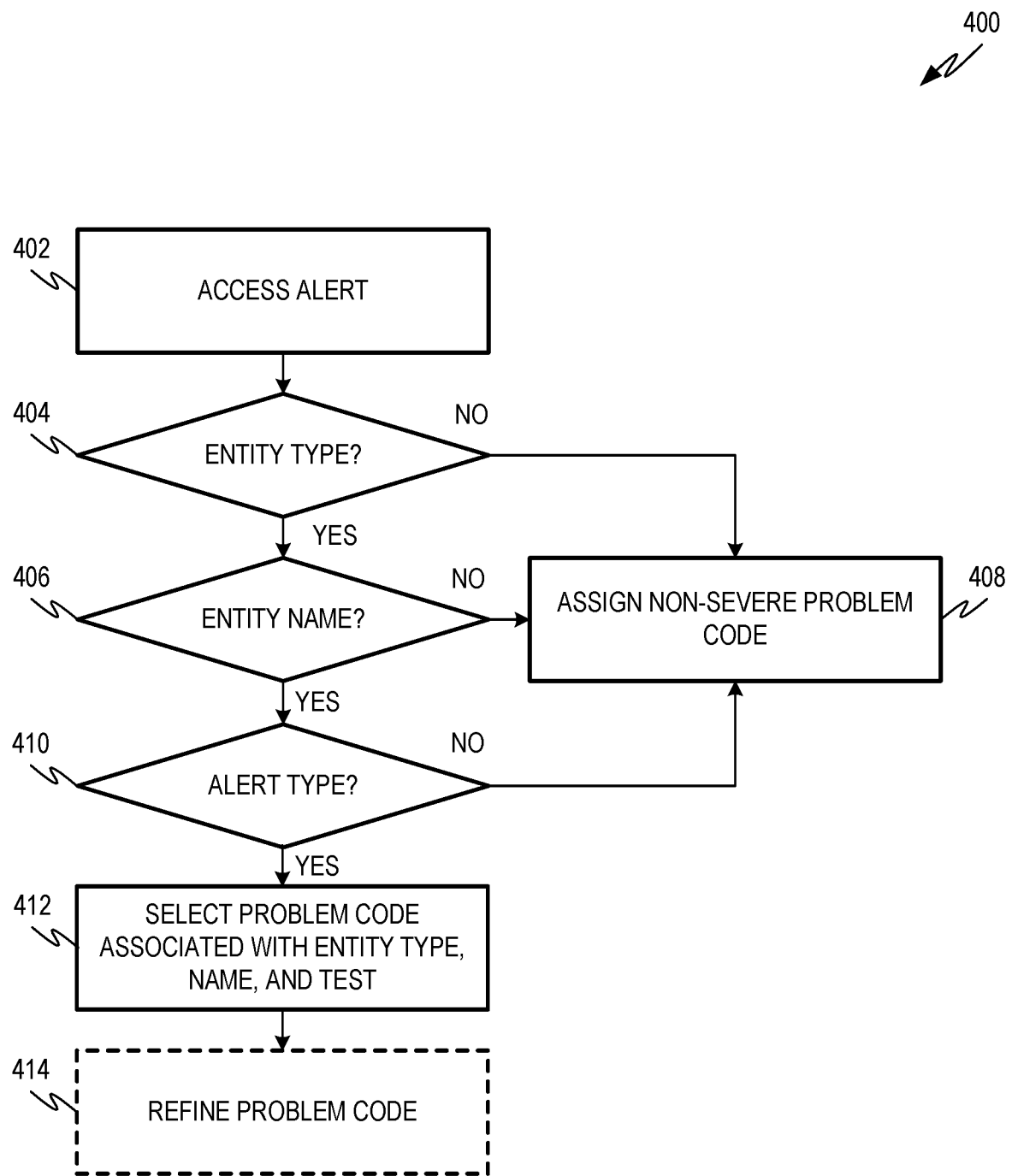
FIG. 4 is a flow chart showing one example of a process flow that may be executed by the administrator system of FIG. 1 to apply a set of problem code conditions to an alert to determine a problem code associated with the alert.

FIG. 4 is a flow chart showing one example of a process flow 400 that may be executed by the administrator system 102 (e.g., the problem state subsystem 170 thereof) to apply a set of problem code conditions to an alert 152 to determine a problem code associated with the alert. For example, the process flow 400 shows one example way that the administrator system 102 may execute operation 308 of the process flow 300 from FIG. 3.

At operation 402, the administrator system 102 may access an alert 152. At operation 404, the administrator system 102 may determine if the alert 152 matches an entity type condition indicated by the problem code conditions. As described herein, the problem code conditions may include one or more entity types. The alerts 152 may indicate an associated entity, which may be a synthetic test client 106, 108; a process 110, 112, 114; a service 116, 118, 120; a host 122, 124, 126; or any other suitable entity of the web management software 150. The associated entity, for example, may be the entity that is the subject of the alert (for example, the entity that generated the alert and/or the entity whose condition as described by the alert). In some examples, entity type conditions from the set of problem code conditions may be applied in a predetermined order. In this example, the administrator system 102 may apply the entity type conditions in the predetermined order until the alert 152 matches one of the considered entity type conditions, at which point the administrator system 102 may proceed to operation 406 as described herein.

If the alert 152 does not match any entity type conditions of the set of problem code conditions, then the administrator system 102 may, at operation 408, assign a non-severe problem code for the alert 152. In some examples, returning a non-severe problem code includes returning no problem code for the alert 152. In other examples, returning a non-severe problem code includes returning a code that indicates a lack of severity associated with the alert 152.

If the alert 152 matches an entity type condition included in the problem code conditions, then the administrator system 102 may, at operation 406, determine whether the alert 152 matches any entity name condition associated with the matched entity type condition, at operation 404. If the alert 152 does not match any entity name condition associated with the matched entity type condition, then the administrator system 102 may assign a non-severe problem code to the alert 152 at operation 408 as described herein. If the alert 152 does match an entity name condition associated with the matched entity type condition, then the administrator system 102 may, at operation 410, determine if the alert 152 matches any alert type condition associated with the matched entity name condition. If no alert type condition associated with matched entity name condition is determined at operation 410, then the administrator system 102 may return a non-severe problem code at operation 408, as described herein. In some examples, entity name conditions may also be applied in a predetermined order. For example, at operation 406, the administrator system 102 may proceed to operation 410 upon finding a first matched entity name condition.

If there is a match between the alert 152 and a alert type condition associated with the matched entity name condition, then at operation 412, the administrator system 102 may select, for the alert 152, the problem code associated with the matched entity type condition, the matched entity name condition, and the matched alert type condition. At optional operation 414, the administrator system 102 (e.g., the problem state subsystem 170 thereof) may refine the problem code, for example, as described herein. In some examples, alert type conditions may also be applied in a predetermined order. For example, at the operation 406, the administrator system 102 may proceed to operation 412 upon finding a first matched alert type condition.

Figure 5:
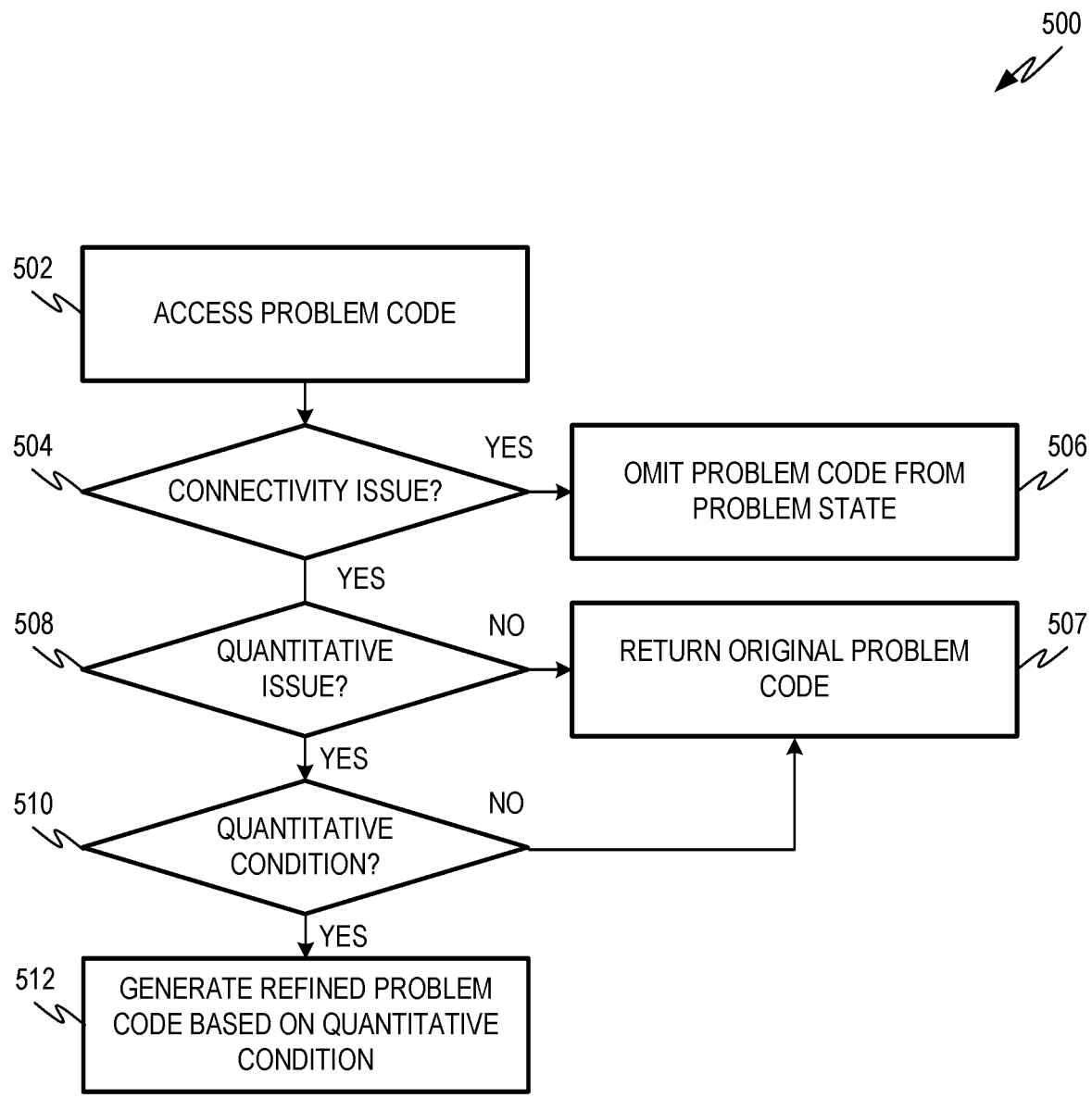
FIG. 5 is a flow chart showing one example of a process flow that may be executed by the administrator system of FIG. 1 to refine a problem code for an alert.

FIG. 5 is a flow chart showing one example of a process flow 500 that may be executed by the administrator system 102 to refine a problem code for an alert 152. In some examples, the process flow 500 may be executed by the problem state subsystem 170 of the administrator system 102. For example, the process flow 500 shows one example way that the administrator system 102 may execute the optional operation 414 of the process flow 400. At operation 502, the administrator system 102 may access a problem code assigned to an alert 152, for example, as described herein. At operation 504, the administrator system 102 may determine if the problem code indicates a problem or issue with the associated entity that is related to a failure to connect to a subject entity of the web management software 150. Consider an example in which an alert 152 is generated by a synthetic test client 106 that is pinging or otherwise connecting with a process 110, 112, 114 or service 116, 118, 120 of the web management software 150. In this example, the synthetic test client 106 may generate an alert 152 when it fails to connect with one or more processes or services. The alert 152 generated for lack of connectivity may be converted to a problem code as described herein. Such an alert, however, may not represent a real problem with the tested entity. When the administrator system 102 access is a problem code related to a failure to connect to the subject entity of the web management software 150, the administrator system 102 may omit, at operation 506, the corresponding problem code from the problem state of the web management software 150 at operation 506.

If the problem code does not relate to a connectivity error at operation 504, the administrator system 102 may determine, at operation 508, whether the problem code relates to a quantitative issue with the subject entity. A quantitative issue is an issue that can be measured and described numerically. Examples of quantitative issues include response times higher than a threshold and failure rates higher than a threshold. If the problem code does not relate to a quantitative issue at operation 508, then the administrator system 102 may return the originally determined problem code at operation 507. If the problem code does describe a quantitative issue at operation 508, the administrator system 102 may, at operation 510, determine if the quantitative issue described by the problem code meets at least one quantitative condition. If the quantitative issue does not meet the quantitative condition, the administrator system 102 may return the originally determined problem code at operation 507.

If the quantitative issue does meet at least one quantitative condition at operation 510, then the administrator system 102 may generate a refined problem code at operation 512. The refined problem code may be generated based on the quantitative condition. Consider an example quantitative issue related to response time. For example, the problem code may indicate that its subject entity at the web management software 150 has failed to provide a response within a threshold time. Applying the quantitative condition at operation 510 may include comparing the actual response time of the subject entity to one or more additional thresholds. For example, if the actual response time of the subject entity is higher than an additional threshold, then the administrator system 102 may refine the problem code to indicate a higher severity of the associated problem. If the actual response time of the subject entity is lower than the additional threshold, then the administrator system 102 may refine the problem code to indicate a lower severity of the associated problem. In some examples, the quantitative condition applied at operation 510 includes more than one part. For example, the threshold for determining whether to refine a problem code may vary depending on the number or rate of affected requests.

Figure 6:
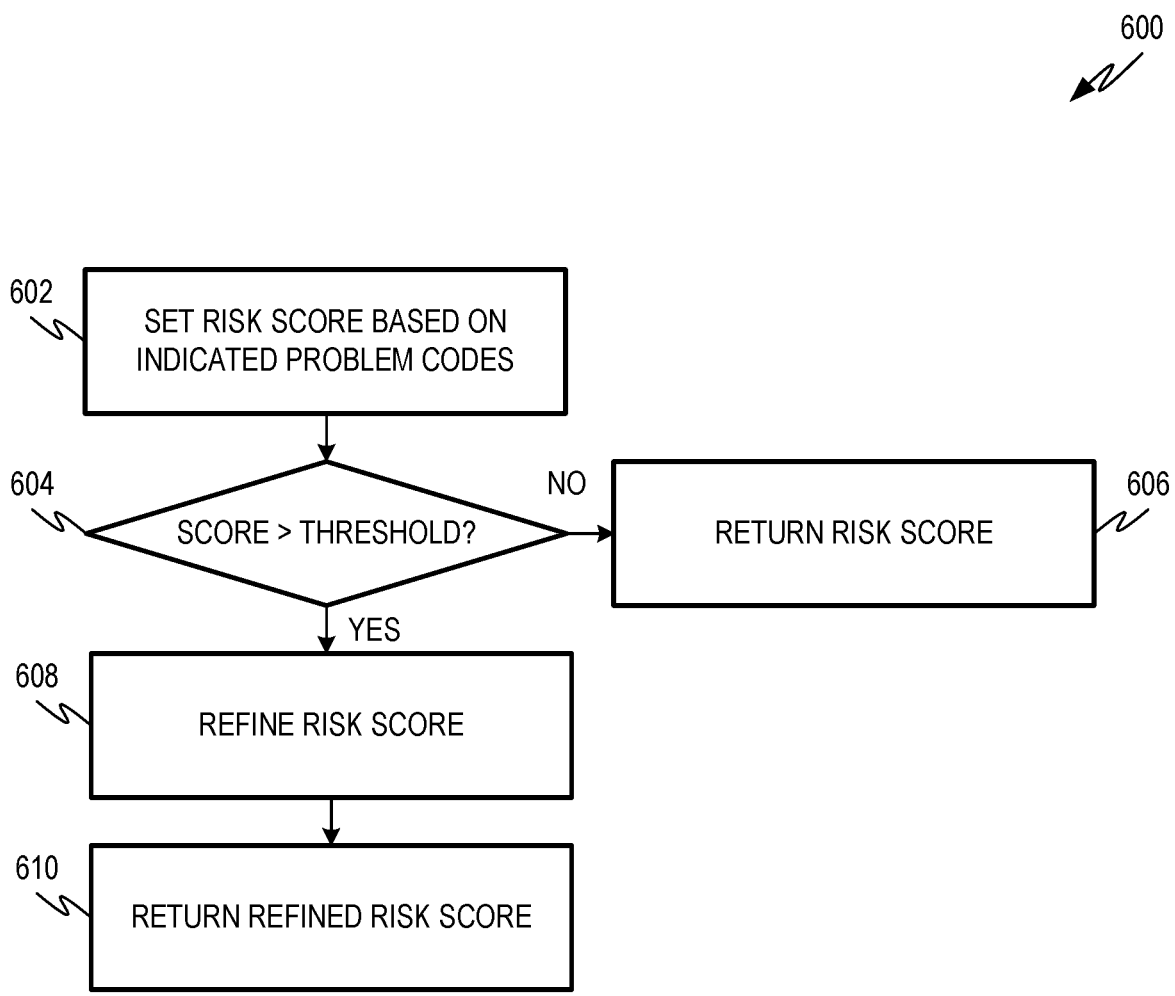
FIG. 6 is a flow chart showing one example of a process flow that may be executed by the administrator system of FIG. 1 to determine a risk score for the web management software based on the problem state for the web management software.

FIG. 6 is a flow chart showing one example of a process flow 600 that may be executed by the administrator system 102 (e.g., the availability risk subsystem 172 thereof) to determine a risk score for the web management software 150 based on the problem state for the web management software 150. The process flow 600 is one example of how the administrator system 102 may execute the operation 210 of the process flow 200 described herein. When the process flow 600 is executed, the administrator system 102 may already have determined a problem state for the web management software 150 in a current time period.

At operation 602, the administrator system 102 may set a risk score for the web management software 150 based on the problem codes included with the problem state of the web management software 150. At operation 604, the administrator system 102 may determine if the risk score determined at operation 602 is less than a threshold value. If the risk score is less than the threshold value, indicating that the availability risk of the web management software 150 is less than a threshold level, then the administrator system 102 may return the risk score at operation 606.

If the risk score determined that operation 602 is greater than the threshold value at operation 604, the administrator system 102 may refine the risk score at operation 608. Refining the risk score may include for example assigning a situation code to the risk score and problem state, assigning a description of the web management software 150 state to the risk score and problem state, and/or assigning a proposed solution to the risk score and problem state. At operation 610, the administrator system 102 may return the refined risk score.

Figure 7:
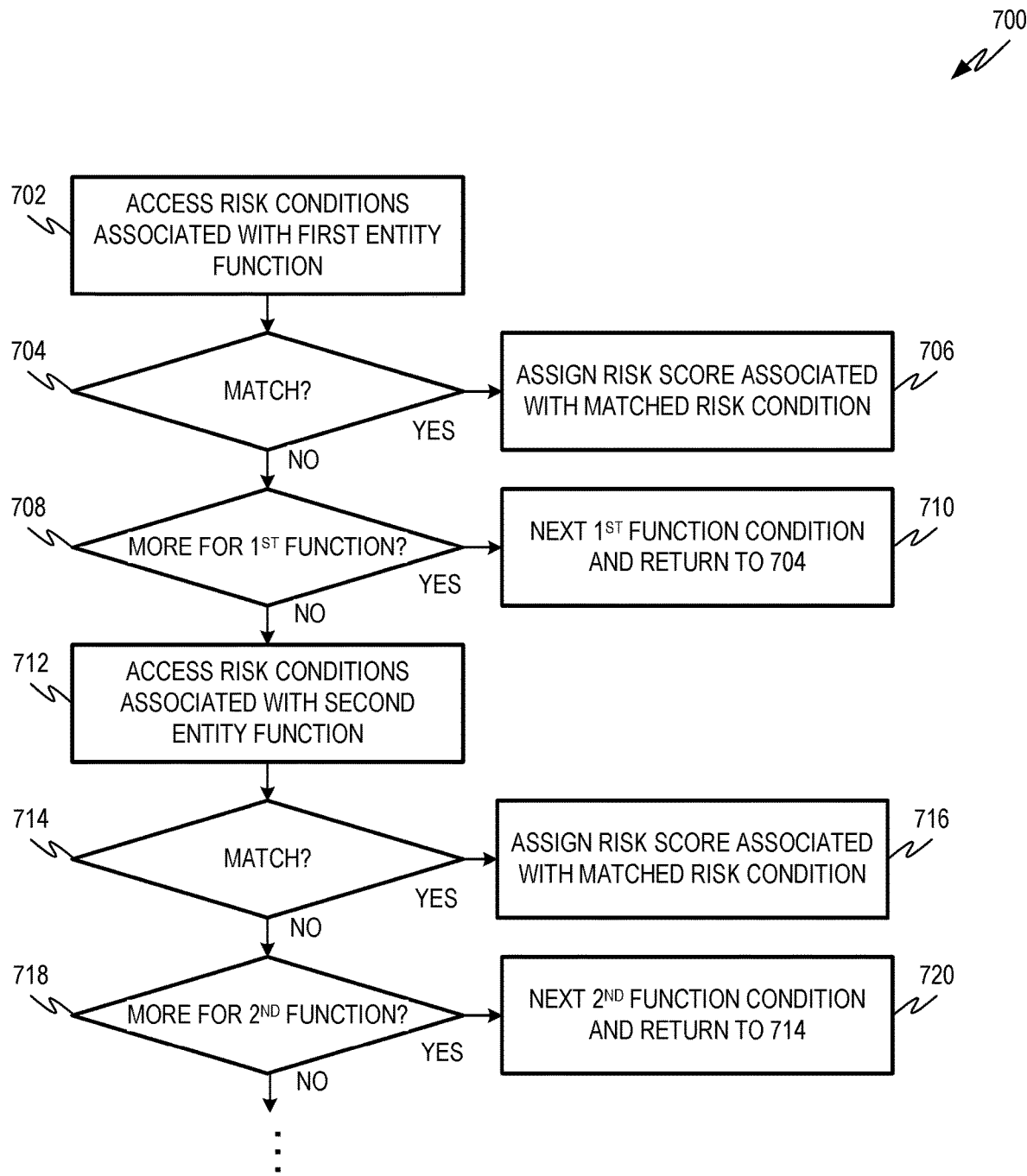
FIG. 7 is a flow chart showing one example of a process flow that may be executed by the administrator system of FIG. 1 to assign a risk score to the web management software given a problem state for the web management software.

FIG. 7 is a flow chart showing one example of a process flow 700 that may be executed by the administrator system 102 (e.g., the availability risk subsystem 172 thereof) to assign a risk score to the web management software 150 given a problem state for the web management software 150. The process flow 700 demonstrates one example of how the administrator system 102 can perform operation 602 of the process flow 600. In the example of FIG. 7, determining the risk score comprises applying a set of risk conditions to the problem state of the web management software 150. The set of risk conditions may be ordered and may be applied by the administrator system 102 such that the first risk and condition of the ordered list to apply to the problem state of the web management software 150 may determine the risk score for the web management software 150. In some examples, the set of risk conditions are stored in a tabular data structure, similar to the tabular data structure 130 described with respect to FIG. 1.

In some examples, the risk conditions are ordered by entity function. For example, the administrator system 102 (e.g., the availability risk subsystem 172 thereof) may first consider risk conditions related to entities of the web management software 150 performing a first function, such as providing various webpages 144 and functionalities for a front-end. If the problem state of the web management software 150 meets one of the risk conditions related to the first entity function, then the administrator system 102 may assign a risk score to the web management software 150 based on the first condition that is met. If the problem state for the web management software 150 fails to meet any of the risk conditions related to the first entity function, then the administrator system 102 may consider risk conditions related to a second entity function, such as backend or back office functionality, and so on.

At operation 702, the administrator system 102 accesses risk condition data associated with the first entity function. The risk condition data may describe risk conditions that are associated with the first entity function. For example, the risk condition data may include risk conditions that are based on problem codes that are associated with entities at the web management software that perform the first entity function. At operation 704, the administrator system 102 determines if a problem state for the web management software 150 matches a first risk condition of the risk conditions associated with the first entity function. If the problem state does match the first risk condition, then the administrator system 102 may, at operation 706, assign, to the web management software 150, a risk score associated with the matched risk condition. If the problem state does not match the risk condition considered at operation 704, then the administrator system 102 may determine, at operation 708, if there are any additional risk conditions associated with the first entity function. If there are additional risk conditions, then the administrator system 102, at operation 710, may move to the next first entity function risk condition and return to operation 704.

If there are no additional risk conditions associated with the first entity function (e.g., if none of the plurality of problem codes making up the problem state meet any of the first entity function risk conditions), then the administrator system 102 may, at operation 712, access risk condition data describing risk conditions associated with the second entity function. At operation 714, the administrator system may determine if the problem state for the web management software 150 matches a first risk condition associated with the second entity function. If there is a match at operation 714, then the administrator system 102 may, at operation 716, assign, to the web management software 150, a risk score associated with the matched risk condition. If there is no match at operation 714, then the administrator system 102 may determine, at operation 718, if there are additional risk conditions associated with the second entity function. If there are additional risk conditions associated with the second entity function, the administrator system may, at operation 720, move to the next second function risk condition and return to operation 714. Although two entity functions are described with respect to the process flow 700, it will be appreciated that, in some examples, the administrator system 102 may up continue to apply risk conditions associated with additional entity functions (not shown in FIG. 7).

Figure 8:
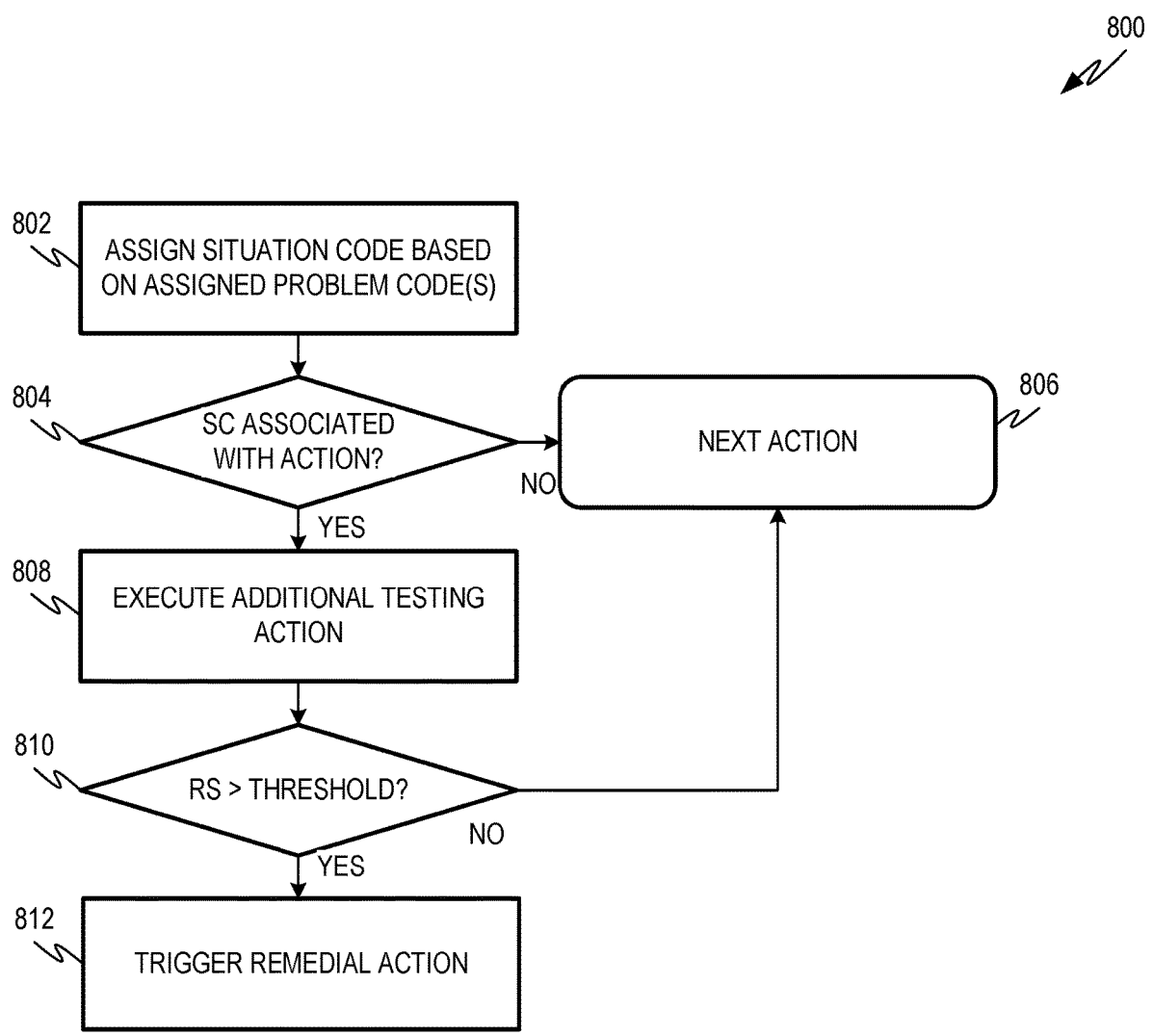
FIG. 8 is a flow chart showing one example of a process flow that may be executed by the administrator system of FIG. 1 to refine the problem state of the web management software.

FIG. 8 is a flow chart showing one example of a process flow 800 that may be executed by the administrator system 102 (e.g., the availability risk subsystem 172 and/or the message subsystem 174) to refine the problem state of the web management software 150. For example, the process flow 800 shows one example way to execute the operation 608 of the process flow 600.

At operation 802, the administrator system 102 may assign a situation code to the web management software 150. The situation code may be based on the problem codes included in the problem state of the web management software. In some examples, determining the situation code may include applying a set of situation conditions to the problem state of the web management software 150. The set of situation conditions may include nested conditions that may be arranged in a tabular data structure, such as the tabular data structure 130 described herein.

At operation 804, the administrator system 102 may determine if a situation code was assigned to the web management software 150 at operation 802. In some examples, a situation code may include additional information and/or an additional description of the state of the web management software. Also, in some examples, a situation code may be associated with most likely situation data. Most likely situation data may include human readable data describing a most likely state of the web management software. The most likely state of the web management software may be a description of a state of the web management software that is most likely to produce the considered problem state.

Some situation codes may be associated with additional actions, such as testing actions, to be performed relative to the web management software. At operation 804, the administrator system 102 may determine if the situation code assigned at operation 802 is associated with an additional action. If the situation code determined that operation 802 is not associated with an additional action, then the administrator system 102 may execute the next action of its programming, at operation 806.

If the situation code is associated with an additional action, then the administrator system 102 may execute the additional action, at operation 808. The additional action may be include, for example, an additional testing action directed to the web management software 150 and or an additional monitoring action. The additional action, in some examples, generates a result which may be a quantifiable result. At operation 810, the administrator system 102 determines if the result of the additional action meets a threshold condition. If the result does not meet the threshold condition, then the administrator system 102 may move to the next action of its programming at operation 806. If the additional action result does meet the threshold condition at operation 810, than the administrator system 102 may trigger a remedial action, at operation 812. The remedial one or more actions are directed towards mitigating the problem state of the web management software 150. In some examples, the remedial action includes sending one or more problem messages 140, 142 to the respective administrative users 132, 134.

EXAMPLES

In view of the above described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system for administering a cloud-implemented web management software, the system comprising: at least one processor programmed to perform operations comprising: accessing alert data describing a plurality of alerts generated by the web management software, the plurality of alerts comprising a first alert generated by a first synthetic test client for testing the web management software, a second alert generated by an executable of the web management software executing at a cloud system; applying a set of problem code conditions to the alert data; based on the applying of the set of problem code conditions to the alert data, assigning a first problem code to the first alert; determining a risk score for the web management software based at least in part on a problem state for the web management software, the problem state comprising at least the first problem code; determining that the risk score for the web management software matches a threshold condition; and based on the determining that the risk score matches the threshold condition, sending a problem message to a user computing device associated with a user, the problem message describing a problem state of the web management software.

In Example 2, the subject matter of Example 1 optionally includes the plurality of alerts being generated during a first time period, the operations further comprising: receiving second alert data describing a second plurality of alerts generated by the web management software during a second time period different than the first time period; and determining that the set of problem code conditions do not result in any problem codes being assigned to the second alert data.

In Example 3, the subject matter of any one or more of Examples 1-2 optionally includes the operations further comprising determining that the first alert is greater than a threshold age.

In Example 4, the subject matter of any one or more of Examples 1-3 optionally includes the operations further comprising: determining that an entity type of the first synthetic test client is described by a first entity type condition of the set of problem code conditions; determining that the first synthetic test client matches a first entity name condition of the set of problem code conditions, the first entity name condition being associated with the first entity type condition; determining that the first alert describes a test result indicated by a alert type condition of the set of problem code conditions, the alert type condition being associated with the first entity type condition and the first entity name condition; and selecting the first problem code based at least in part on the alert type condition, the first entity type condition, and the first entity name condition.

In Example 5, the subject matter of any one or more of Examples 1-4 optionally includes the operations further comprising: based on the applying of the set of problem code conditions to the alert data, assigning a second problem code to the second alert; and determining that the second alert depends at least in part on a connectivity error between a synthetic test client and at least one component of the web management software, the problem state omitting the second problem code.

In Example 6, the subject matter of any one or more of Examples 1-5 optionally includes the operations further comprising: based on the applying of the set of problem code conditions to the alert data, assigning a third problem code to a third alert of the plurality of alerts; determining that the third alert indicates a quantitative problem with the web management software; applying a quantitative condition to the quantitative problem indicated by the third alert; and generating a refined problem code for the third alert, the refined problem code being based at least in part on the applying of the quantitative condition, the problem state comprising the refined problem code.

In Example 7, the subject matter of any one or more of Examples 1-6 optionally includes the problem state comprising a plurality of problem codes, the plurality of problem codes comprising the first problem code, and the determining of the risk score comprising: accessing risk code condition data for a first function of the web management software; and determining that at least one problem code of the plurality of problem codes matches the risk code condition data for the first function, the determined risk score being associated with the risk code condition data for the first function at the risk code condition data.

In Example 8, the subject matter of any one or more of Examples 1-7 optionally includes the problem state comprising a plurality of problem codes, the plurality of problem codes comprising the first problem code, and the determining of the risk score comprising: accessing risk code condition data for a first function of the web management software; determining that none of the plurality of problem codes matches the risk code condition data for the first function; accessing risk code condition data for a second function of web management software; and determining that at least one problem code of the plurality of problem codes matches the risk code condition data for the second function, the determined risk score being associated with the risk code condition data for the second function at the risk code condition data.

In Example 9, the subject matter of any one or more of Examples 1-8 optionally includes the operations further comprising determining a remedial action associated with the problem state, the problem message comprising an indication of the remedial action.

Example 10 is a method for administering a cloud-implemented web management software, the method comprising: accessing alert data describing a plurality of alerts generated by the web management software, the plurality of alerts comprising a first alert generated by a first synthetic test client for testing the web management software, a second alert generated by an executable of the web management software executing at a cloud system; applying a set of problem code conditions to the alert data; based on the applying of the set of problem code conditions to the alert data, assigning a first problem code to the first alert; determining a risk score for the web management software based at least in part on a problem state for the web management software, the problem state comprising at least the first problem code; determining that the risk score for the web management software matches a threshold condition; and based on the determining that the risk score matches the threshold condition, sending a problem message to a user computing device associated with a user, the problem message describing a problem state of the web management software.

In Example 11, the subject matter of Example 10 optionally includes the plurality of alerts being generated during a first time period, the method further comprising: receiving second alert data describing a second plurality of alerts generated by the web management software during a second time period different than the first time period; and determining that the set of problem code conditions do not result in any problem codes being assigned to the second alert data.

In Example 12, the subject matter of any one or more of Examples 10-11 optionally includes determining that the first alert is greater than a threshold age.

In Example 13, the subject matter of any one or more of Examples 10-12 optionally includes determining that an entity type of the first synthetic test client is described by a first entity type condition of the set of problem code conditions; determining that the first synthetic test client matches a first entity name condition of the set of problem code conditions, the first entity name condition being associated with the first entity type condition; determining that the first alert describes a test result indicated by a alert type condition of the set of problem code conditions, the alert type condition being associated with the first entity type condition and the first entity name condition; and selecting the first problem code based at least in part on the alert type condition, the first entity type condition, and the first entity name condition.

In Example 14, the subject matter of any one or more of Examples 10-13 optionally includes based on the applying of the set of problem code conditions to the alert data, assigning a second problem code to the second alert; and determining that the second alert depends at least in part on a connectivity error between a synthetic test client and at least one component of the web management software, the problem state omitting the second problem code.

In Example 15, the subject matter of any one or more of Examples 10-14 optionally includes based on the applying of the set of problem code conditions to the alert data, assigning a third problem code to a third alert of the plurality of alerts; determining that the third alert indicates a quantitative problem with the web management software; applying a quantitative condition to the quantitative problem indicated by the third alert; and generating a refined problem code for the third alert, the refined problem code being based at least in part on the applying of the quantitative condition, the problem state comprising the refined problem code.

In Example 16, the subject matter of any one or more of Examples 10-15 optionally includes the problem state comprising a plurality of problem codes, the plurality of problem codes comprising the first problem code, and the determining of the risk score comprising: accessing risk code condition data for a first function of the web management software; and determining that at least one problem code of the plurality of problem codes matches the risk code condition data for the first function, the determined risk score being associated with the risk code condition data for the first function at the risk code condition data.

In Example 17, the subject matter of any one or more of Examples 10-16 optionally includes the problem state comprising a plurality of problem codes, the plurality of problem codes comprising the first problem code, and the determining of the risk score comprising: accessing risk code condition data for a first function of the web management software; determining that none of the plurality of problem codes matches the risk code condition data for the first function; accessing risk code condition data for a second function of web management software; and determining that at least one problem code of the plurality of problem codes matches the risk code condition data for the second function, the determined risk score being associated with the risk code condition data for the second function at the risk code condition data.

In Example 18, the subject matter of any one or more of Examples 10-17 optionally includes determining a remedial action associated with the problem state, the problem message comprising an indication of the remedial action.

Example 19 is a non-transitory machine-readable medium comprising instructions thereon that, when executed by at least one processor, cause the at least one processor to perform operations comprising: accessing alert data describing a plurality of alerts generated by a cloud-implemented web management software, the plurality of alerts comprising a first alert generated by a first synthetic test client for testing the web management software, and a second alert generated by an executable of the web management software executing at a cloud system; applying a set of problem code conditions to the alert data; based on the applying of the set of problem code conditions to the alert data, assigning a first problem code to the first alert; determining a risk score for the web management software based at least in part on a problem state for the web management software, the problem state comprising at least the first problem code; determining that the risk score for the web management software matches a threshold condition; and based on the determining that the risk score matches the threshold condition, sending a problem message to a user computing device associated with a user, the problem message describing a problem state of the web management software.

In Example 20, the subject matter of Example 19 optionally includes the plurality of alerts being generated during a first time period, the operations further comprising: receiving second alert data describing a second plurality of alerts generated by the web management software during a second time period different than the first time period; and determining that the set of problem code conditions do not result in any problem codes being assigned to the second alert data.

Figure 9:
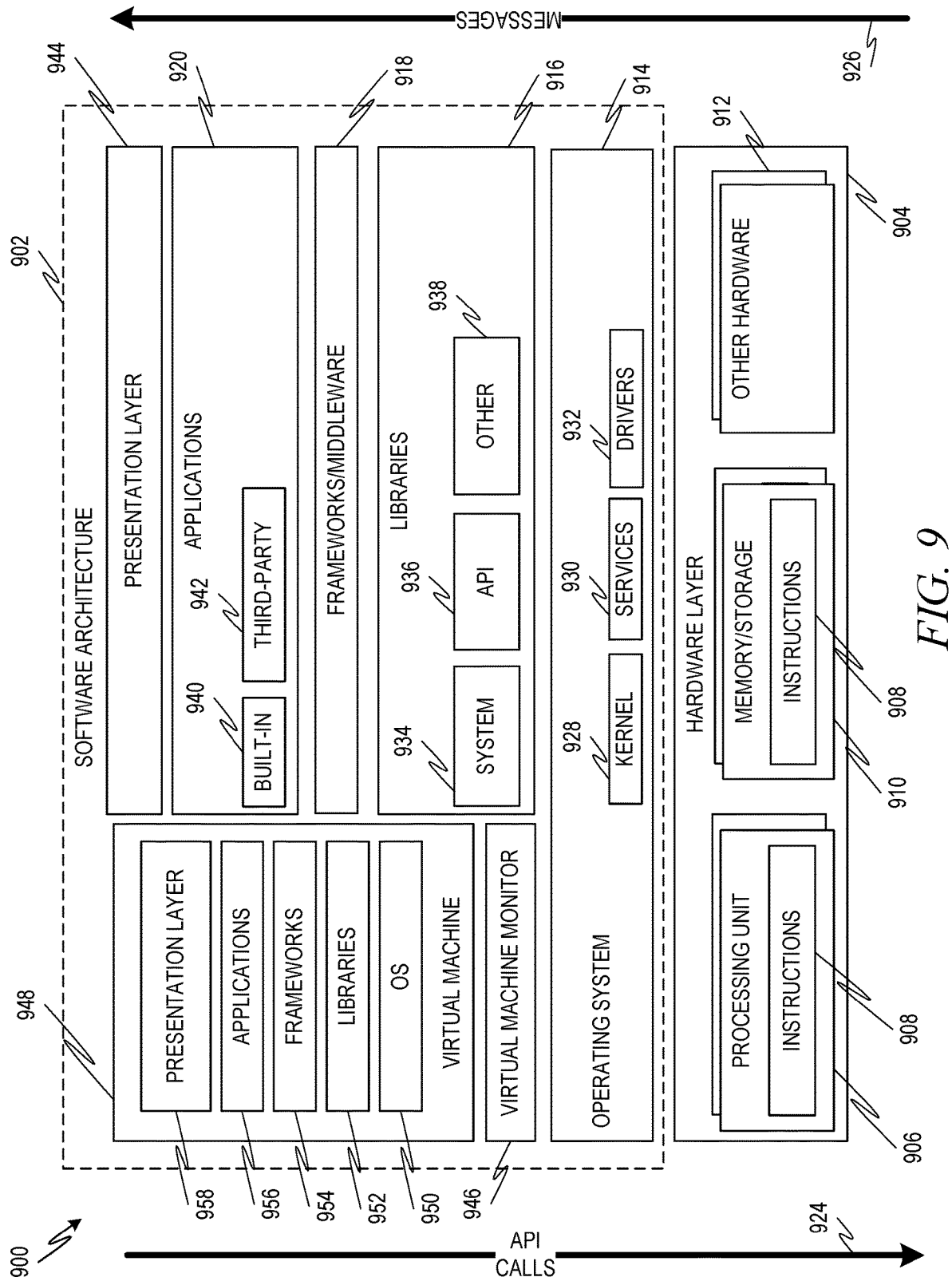
FIG. 9 is a block diagram showing one example of a software architecture for a computing device.

FIG. 9 is a block diagram 900 showing one example of a software architecture 902 for a computing device. The software architecture 902 may be used in conjunction with various hardware architectures, for example, as described herein. FIG. 9 is merely a non-limiting example of a software architecture, and many other architectures may be implemented to facilitate the functionality described herein. An example hardware layer 904 is illustrated and can represent, for example, any of the above referenced computing devices. In some examples, the hardware layer 904 may be implemented according to the architecture of the computer system of FIG. 9.

The hardware layer 904 comprises one or more processing units 906 having associated executable instructions 908. Executable instructions 908 represent the executable instructions of the software architecture 902, including implementation of the methods, modules, subsystems, and components, and so forth described herein and may also include memory and/or storage modules 910, which also have executable instructions 908. Hardware layer 904 may also comprise other hardware as indicated by other hardware 912 which represents any other hardware of the hardware layer 904, such as the other hardware illustrated as part of the software architecture 902.

In the example architecture of FIG. 9, the software architecture 902 may be conceptualized as a stack of layers where each layer provides particular functionality. For example, the software architecture 902 may include layers such as an operating system 914, libraries 916, middleware 918, applications 920 and presentation layer 944. Operationally, the applications 920 and/or other components within the layers may invoke application programming interface (API) calls 924 through the software stack and access a response, returned values, and so forth illustrated as messages 926 in response to the API calls 924. The layers illustrated are representative in nature and not all software architectures have all layers. For example, some mobile or special purpose operating systems may not provide middleware 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. In some examples, the services 930 include an interrupt service. The interrupt service may detect the receipt of an interrupt and, in response, cause the software architecture 902 to pause its current processing and execute an interrupt service routine (ISR) when an interrupt is accessed.

The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the operating system 914 functionality (e.g., kernel 928, services 930 and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 916 may also include a wide variety of other libraries 938, such as machine learning libraries, to provide many other APIs to the applications 920 and other software components/modules.

The middleware 918 (also sometimes referred to as a frameworks layer) may provide a higher-level common infrastructure that may be utilized by the applications 920 and/or other software components/modules. For example, the middleware 918 may provide various graphic user interface (GUI) functions, high-level resource management, high-level location services, and so forth. The middleware 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a contacts application, a browser application, a book reader application, a location application, a media application, a messaging application, and/or a game application. Third-party applications 942 may include any of the built in applications as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 942 may invoke the API calls 924 provided by the mobile operating system such as operating system 914 to facilitate functionality described herein.

The applications 920 may utilize built in operating system functions (e.g., kernel 928, services 930 and/or drivers 932), libraries (e.g., system libraries 934, API libraries 936, and other libraries 938), middleware 918 to create user interfaces to interact with users of the system. Alternatively, or additionally, in some systems interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware computing device. A virtual machine is hosted by a host operating system (operating system 914) and typically, although not always, has a virtual machine monitor 946, which manages the operation of the virtual machine as well as the interface with the host operating system (i.e., operating system 914). A software architecture executes within the virtual machine 948 such as an operating system 950, libraries 952, frameworks/middleware 954, applications 956 and/or presentation layer 958. These layers of software architecture executing within the virtual machine 948 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 10:
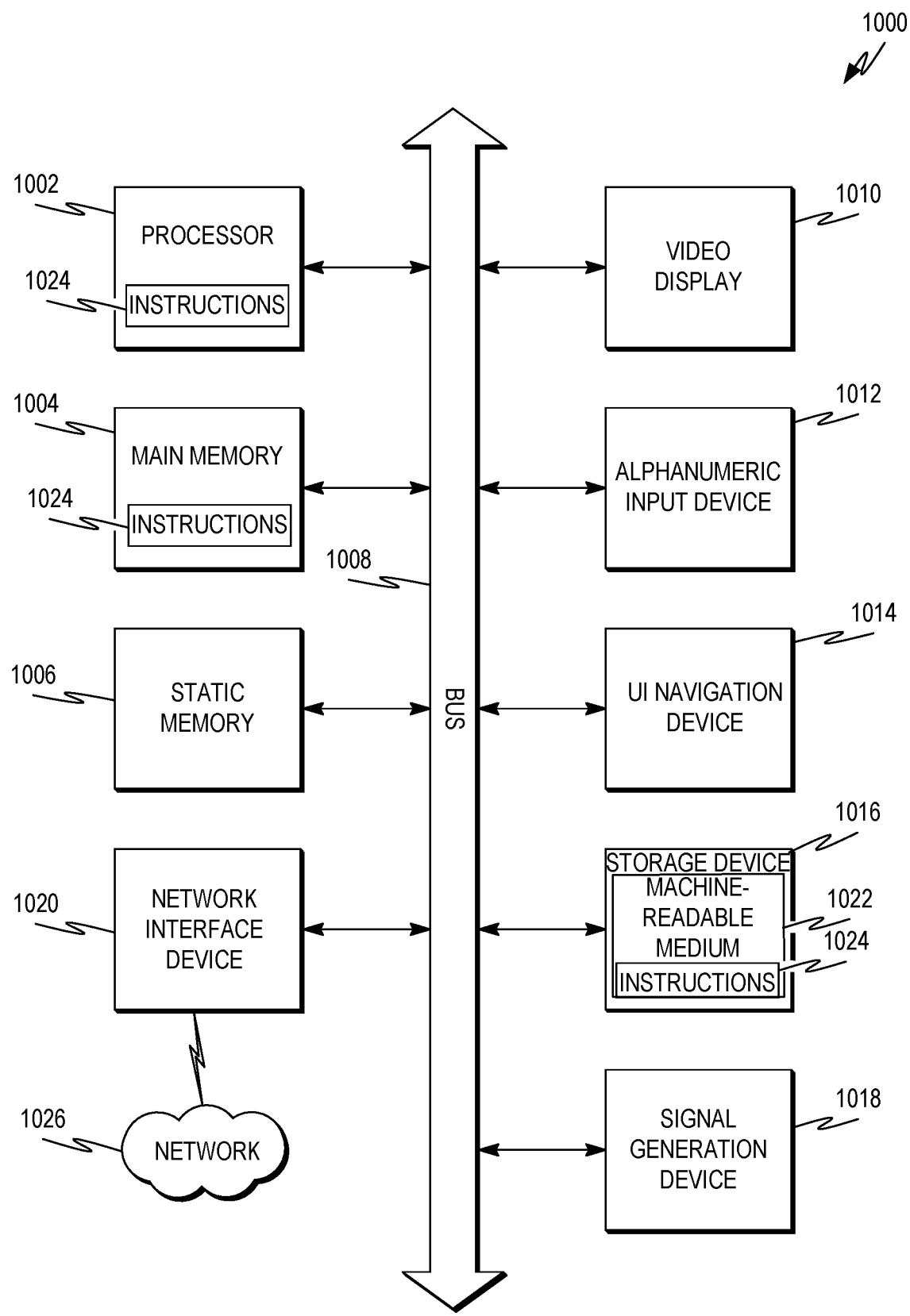
FIG. 10 is a block diagram of a machine in the example form of a computer system within which instructions may be executed for causing the machine to perform any one or more of the methodologies discussed herein.

FIG. 10 is a block diagram of a machine in the example form of a computer system 1000 within which instructions 1024 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation (or cursor control) device 1014 (e.g., a mouse), a disk drive unit 1016, a signal generation device 1018 (e.g., a speaker), and a network interface device 1020.

Machine-Readable Medium

The disk drive unit 1016 includes a machine-readable medium 1022 thereon is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, with the main memory 1004 and the processor 1002 also constituting machine-readable media 1022.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. A machine-readable medium is not a transmission medium.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1024 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for operating cloud-implemented web management software, the system comprising:
at least one cloud system processor programmed to perform operations comprising:
executing a plurality of web management executables, the plurality of web management executables to implement the web management software;
executing a first synthetic test client;
querying, by the first synthetic test client, at least one of the plurality of executing web management executables;
receiving, by the first synthetic test client, a response to the querying;
generating, by the first synthetic test client, a first alert, the generating of the first alert being based at least in part on the response to the querying;
accessing alert data describing a plurality of alerts describing the web management software, the plurality of alerts comprising the first alert and a second alert generated by a web management executable of the plurality of web management executables;
applying a set of problem code conditions to the alert data, the applying of the set of problem code conditions to the alert data comprising determining that an entity type of the first synthetic test client is described by a first entity type condition of the set of problem code conditions and determining that an entity type of the executable is described by a second entity type condition of the set of problem code conditions;
determining that the first synthetic test client matches a first entity name condition of the set of problem code conditions, the first entity name condition being associated with the first entity type condition;
determining that the first alert describes a test result indicated by an alert type condition of the set of problem code conditions, the alert type condition being associated with the first entity type condition and the first entity name condition;
based on the applying of the set of problem code conditions to the alert data, assigning a first problem code to the first alert, the assigning of the first problem code being based at least in part on the first entity type condition and the second entity type condition, the alert type condition and the first entity name condition;

based on the applying of the set of problem code conditions to the alert data, assigning a second problem code to the second alert, the assigning of the second problem code being based at least in part on the second entity type condition;

determining a risk score for the web management software, the determining of the risk score comprising executing a second synthetic test client for testing the web management software, the risk score being based at least in part on a problem state for the web management software, the problem state comprising at least the first problem code, the second problem code, and a third problem code generated by the second synthetic test client;

determining that the risk score for the web management software matches a threshold condition; and based on the determining that the risk score matches the threshold condition, executing a remedial action to mitigate the problem state at the web management software.

2. The system of claim 1, the plurality of alerts being generated during a first time period, the operations further comprising:

receiving second alert data describing a second plurality of alerts generated by the web management software during a second time period different than the first time period; and determining that the set of problem code conditions do not result in any problem codes being assigned to the second alert data.

3. The system of claim 1, the operations further comprising determining that the first alert is greater than a threshold age.

4. The system of claim 1, the operations further comprising determining that the second alert no claims are at least in part on a connectivity error between a synthetic test client and at least one component of the web management software, the problem state omitting the second problem code.

5. The system of claim 1, the operations further comprising:

based on the applying of the set of problem code conditions to the alert data, assigning a fourth problem code to a third alert of the plurality of alerts;

determining that the third alert indicates a quantitative problem with the web management software;

applying a quantitative condition to the quantitative problem indicated by the third alert; and generating a refined problem code for the third alert, the refined problem code being based at least in part on the applying of the quantitative condition, the problem state comprising the refined problem code.

6. The system of claim 1, the determining of the risk score comprising:

accessing risk condition data for a first function of the web management software, the risk condition data describing a plurality of risk conditions associated with the first function of the web management software; and determining that the second problem code matches the risk condition data for the first function, the determined risk score being based at least in part on the determining that the second problem code matches the risk condition data for the first function.

7. The system of claim 1, the determining of the risk score comprising:

accessing risk condition data for a first function of the web management software, the risk condition data describing a plurality of risk conditions associated with the first function of the web management software;

determining that none of the plurality of problem codes matches the risk condition data for the first function;

accessing risk condition data for a second function of web management software; and determining that at least one problem code of the plurality of problem codes matches the risk condition data for the second function, the determined risk score being based at least in part on the risk condition data.

8. The system of claim 1, the operations further comprising:

sending a problem message to a user computing device associated with a user, the problem message describing a problem state of the web management software; and determining a remedial action associated with the problem state, the problem message comprising an indication of the remedial action.

9. A method for operating cloud-implemented web management software, the method comprising:

executing, by a hardware cloud platform, a plurality of web management executables, the plurality of web management executables to implement the web management software;

executing, by the hardware cloud platform, a first synthetic test client;

querying, by the first synthetic test client, at least one of the plurality of executing web management executables;

receiving, by the first synthetic test client, a response to the querying;

generating, by the first synthetic test client, a first alert, the generating of the first alert being based at least in part on the response to the querying;

accessing alert data describing a plurality of alerts describing the web management software, the plurality of alerts comprising the first alert and a second alert generated by a web management executable of the plurality of web management executables;

applying a set of problem code conditions to the alert data, the applying of the set of problem code conditions to the alert data comprising determining that an entity type of the first synthetic test client is described by a first entity type condition of the set of problem code conditions and determining that an entity type of the executable is described by a second entity type condition of the set of problem code conditions;

determining that the first synthetic test client matches a first entity name condition of the set of problem code conditions, the first entity name condition being associated with the first entity type condition;

determining that the first alert describes a test result indicated by an alert type condition of the set of problem code conditions, the alert type condition being associated with the first entity type condition and the first entity name condition;

based on the applying of the set of problem code conditions to the alert data, assigning a first problem code to the first alert, the assigning of the first problem code being based at least in part on the first entity type condition and the second entity type condition, the alert type condition and the first entity name condition;

based on the applying of the set of problem code conditions to the alert data, assigning a second problem code to the second alert, the assigning of the second problem code being based at least in part on the second entity type condition;

determining a risk score for the web management software, the determining of the risk score comprising executing a second synthetic test client for testing the web management software, the risk score being based at least in part on a problem state for the web management software, the problem state comprising at least the first problem code, the second problem code, and a third problem code generated by the second synthetic test client;

determining that the risk score for the web management software matches a threshold condition; and based on the determining that the risk score matches the threshold condition, executing a remedial action to mitigate the problem state at the web management software.

10. The method of claim 9, the plurality of alerts being generated during a first time period, the method further comprising:

receiving second alert data describing a second plurality of alerts generated by the web management software during a second time period different than the first time period; and determining that the set of problem code conditions do not result in any problem codes being assigned to the second alert data.

11. The method of claim 9, further comprising determining that the first alert is greater than a threshold age.

12. The method of claim 9, further comprising determining that the second alert depends at least in part on a connectivity error between a synthetic test client and at least one component of the web management software, the problem state omitting the second problem code.

13. The method of claim 9, further comprising:

based on the applying of the set of problem code conditions to the alert data, assigning a fourth problem code to a third alert of the plurality of alerts;

determining that the third alert indicates a quantitative problem with the web management software;

applying a quantitative condition to the quantitative problem indicated by the third alert; and generating a refined problem code for the third alert, the refined problem code being based at least in part on the applying of the quantitative condition, the problem state comprising the refined problem code.

14. The method of claim 9, the determining of the risk score comprising:

accessing risk condition data for a first function of the web management software, the risk condition data describing a plurality of risk conditions associated with the first function of the web management software; and determining that the second problem code matches the risk condition data for the first function, the determined risk score being based at least in part on the determining that the second problem code matches the risk condition data for the first function.

15. The method of claim 9, the determining of the risk score comprising:

accessing risk condition data for a first function of the web management software, the risk condition data describing a plurality of risk conditions associated with the first function of the web management software;

determining that none of the plurality of problem codes matches the risk condition data for the first function;

accessing risk condition data for a second function of web management software; and determining that at least one problem code of the plurality of problem codes matches the risk condition data for the second function, the determined risk score being based at least in part on the risk condition data.

16. The method of claim 9, further comprising:

sending a problem message to a user computing device associated with a user, the problem message describing a problem state of the web management software; and determining a remedial action associated with the problem state, the problem message comprising an indication of the remedial action.

17. A non-transitory machine-readable medium comprising instructions thereon that, when executed by at least one cloud system processor, cause the at least one cloud system processor to perform operations comprising:

executing a plurality of web management executables, the plurality of web management executables to implement web management software;

executing a first synthetic test client;

at least in part on the first entity type condition, the alert type condition and the first entity name condition;

based on the applying of the set of problem code conditions to the alert data, assigning a second problem code to the second alert, the assigning of the second problem code being based at least in part on the second entity type condition;

determining a risk score for the web management software, the determining of the risk score comprising executing a second synthetic test client for testing the web management software, the risk score being based at least in part on a problem state for the web management software, the problem state comprising at least the first problem code, and a third problem code generated by the second synthetic test client;

determining that the risk score for the web management software matches a threshold condition; and based on the determining that the risk score matches the threshold condition, executing a remedial action to mitigate the problem state at the web management software.

18. The medium of claim 17, the plurality of alerts being generated during a first time period, the operations further comprising:

receiving second alert data describing a second plurality of alerts generated by the web management software during a second time period different than the first time period; and determining that the set of problem code conditions do not result in any problem codes being assigned to the second alert data.

19. The medium of claim 17, the operations further comprising determining that the first alert is greater than a threshold age.

20. The medium of claim 17, the operations further comprising determining that the second alert depends at least in part on a connectivity error between a synthetic test client and at least one component of the web management software, the problem state omitting the second problem code.

* * * * *